TELEPHONIC EQUIPMENT MONITORING SYSTEM
Filed Aug. 23, 1960
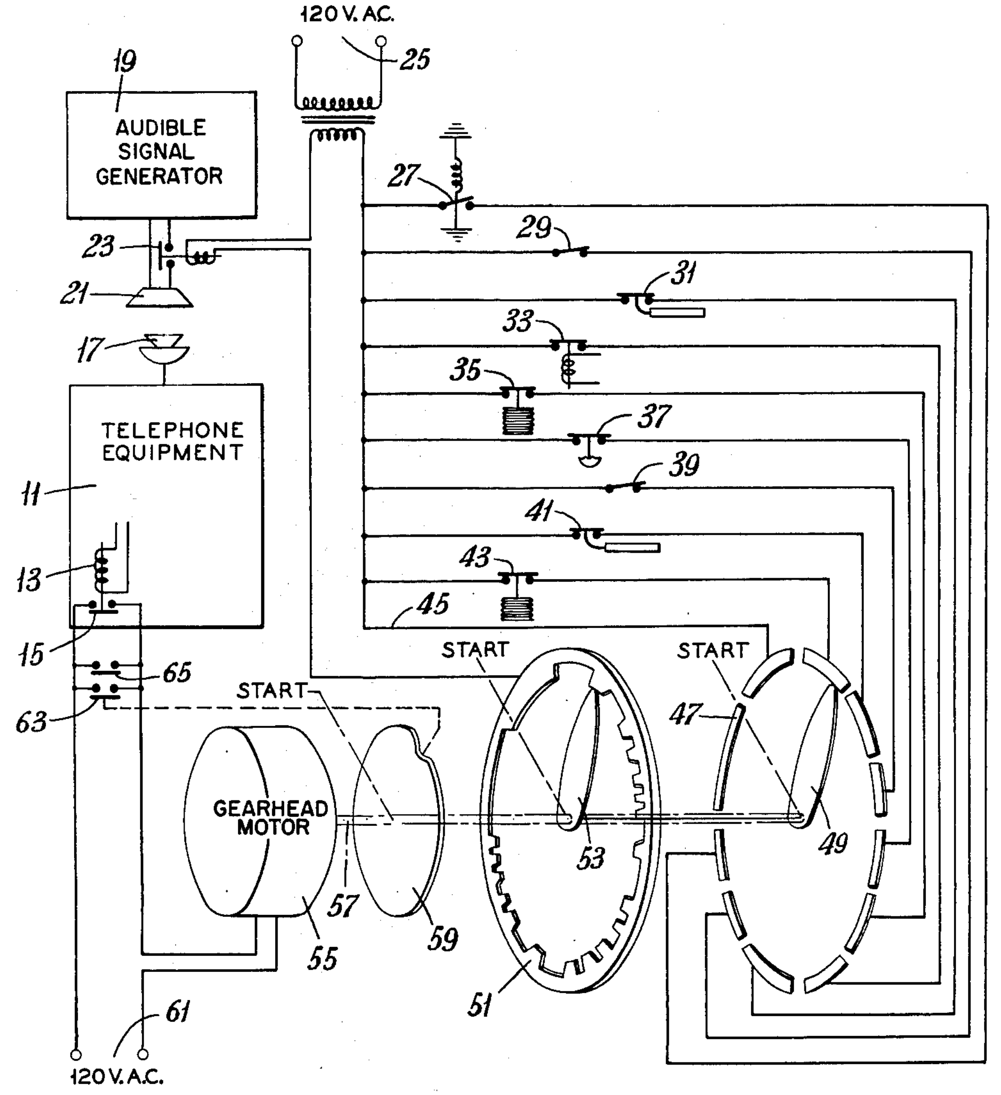
INVENTOR.
WILLIAM L. CALVERT
BY Howard K. Kothe
ATTORNEY

United States Patent Office 3,205,308
Patented Sept. 7, 1965

3,205,308

TELEPHONIC EQUIPMENT MONITORING SYSTEM

William L. Calvert, Westfield, N.J., assignor to Union Carbide Corporation, a corporation of New York Filed Aug. 23, 1960, Ser. No. 51,330
9 Claims. (Cl. 179—2)

The present invention relates to a system for remote monitoring of preselected mechanical and environmental conditions through a telephone communication system and more particularly to a system for transmitting preassigned identifiable audible code signals into a telephone communication system to permit telephonic surveillance from any call station in said telephone communication system.

The nature of many industrial and experimental operations makes important the periodic determination of conditions of a multiplicity of controlled environment and controlled mechanical and physical parameters. Malfunctioning of environmental conditioning equipment, pumps, compressors, utility services and the like is apt to affect adversely, the safety, health and comfort of personnel and the successful continuance of industrial processes and laboratory experiments. Moreover, the consequences of malfunctions are apt to be most serious when an improper condition remains undetected and uncorrected for a protracted period of time.

Surveillance systems in current use include inspection tours by plant security or maintenance personnel and automatic annunciator and alarm apparatus comprising sensing devices combined with transmission systems to convey sensed data to a receiving and indicating device. The principal disadvantage of the former system is the high cost of the man-hours involved if inspection is continuous or frequent enough to be effective. Disadvantages of the latter systems are the generally high cost of transmitting and receiving equipment and the fact that the points of information reception and indication are fixed by the location of the alarm and annunciator panels.

The monitoring system of the present invention provides means for keeping conditions such as those above described under continued surveillance and offers outstanding advantages in both cost and flexibility over presently used systems.

In the apparatus of the present invention, sensing elements, in which electrical contacts are closed or opened according to satisfactory or unsatisfactory conditions of the variables being monitored, are required, as in most remote point monitoring systems. Transmission, however, is effected through standard telephonic equipment, available at utility rates, and existing telephone circuitry. No special receiving or indicating device is required, since the transmitted information is receivable in the form of audible coded signals at any regular telephone. The present invention thus makes it possible for guards, maintenance personnel, power house attendents, and other interested persons to check on monitored conditions and equipment at any time from any conveniently located telephone. Operation of the apparatus of the present invention is independent of and causes no interference with or extraordinary effect on the routine functioning of the telephone communication system in conjunction with which it is used.

With the foregoing and other features in view, all of which shall more fully hereinafter appear, the invention comprises certain novel constructions, combinations and arrangements of components as will now be described and as defined in the appended claims and as illustrated, in preferred embodiment, in the accompanying drawing which is a schematic-diagrammatic presentation of the telephonic equipment monitoring system of the present invention.

In the drawing, an untended local station 11 of a telephone communication system, not otherwise shown, having therein a relay 13 with a normally open contactor 15 adapted to close when said station is called and a microphone 17 to accept audible signals, is shown arranged in juxtaposition to a speaker 21 of an audible signal generator 19. An electrically operated switch 23, open when deenergized and closed when energized, is arranged in an output stage of audible signal generator 19, in circuit with a potential source 25, a multiple arrangement of automatic switches indicated by designations 27, 29, 31, 33, 35, 37, 39, 41 and 43 and two multipoint selector switches 47 and 51, having respective common points forming contact arms 49 and 53 which are electrically connected. A gearhead motor, 55 is arranged to drive a shaft 57 on which is mounted the contact arms 49 and 53 and a seal-in holding cam 59, the function of which will be explained below. The terminals of motor 55 are in circuit with the normally open contactor 15 of relay 13 and a potential source 61. A seal-in contactor 63, adapted to be closed by seal-in holding cam 59 upon initial rotation of shaft 57, held closed for one complete revolution and released at the completion thereof, is connected in parallel with the normally open contactor 15 of relay 13. A momentary contact switch 65 is also connected in parallel with the normally open contactor 15 of relay 13 and the seal-in contactor 63, to provide a local testing switch for the equipment.

Parameters associated respectively with the switches 27 through 43 each have preassigned thereto a code signal comprising a single or sequential series of codeform audible sounds. Each of switches 27 through 43 is adapted to close when the condition to which it is responsive is normal and to open when said condition is otherwise than normal. While the array of automatic switches shown in the drawing includes temperature switches, undervoltage relays, ground fault relays, pressure switches and the like, persons skilled in the art will readily appreciate that any switching device properly responsive to the condition to be monitored can be applied to function in a manner similar to that of automatic switches 27 through 43.

To operate the apparatus of the present invention, untended local station 11 is called through a telephone switchboard or, in the case of fully automatic systems, dialed directly from any remote call station. Upon receiving a call, the untended local station responds by connecting microphone 17 to the system transmitting circuit and closing contactor 15 of station relay 13. Microphone 17 remains connected to the system line and contractor 15 of relay 13 remains closed for a predetermined period of time corresponding to the time required for one complete scanning sequence of the multipoint switches. Should a calling party hang up before the end of said predetermined period, the untended local station will remain on the system line for the full period. Should the same or another party call again before expiration of the period, said party will receive a busy signal.

Closed contactor 15 completes a circuit from motor 55 to potential source 61 and the motor operates, turning shaft 57 in clockwise rotation from the position designated "start" in the drawing. Contact arms 53 and 49 and seal-in holding cam 59, which are fixedly mounted on shaft 57, rotate with the shaft. Proceeding clockwise from the start position, substantially simultaneous first contacts are made by contact arm 53 with a first inwardly projecting portion or first point of multipoint switch 51 and by contact arm 49 with the first point of multipoint switch 47, completing a circuit from potential source 25 to electrically operated switch 23 through conductor 45 and the multipoint switches. Thus energized, electrically operated switch 23 closes, completing a circuit between audible signal generator 19 and speaker 21, and causing a continuous audible sound to impinge on microphone 17. The caller, at the remote call station, hears a codeform long dash, which, in the preferred embodiment, is used as a starting or orientation signal. As shaft rotation continues, the first-established contacts made by contact arms 53 and 49 are broken when the arms leave the first points, power source 25 is disconnected from switch 23 and the circuit to speaker 21 is interrupted, causing the audible signal to stop.

In a continuing rotational progression, contact arm 49 sequentially contacts second, third, fourth, fifth, sixth, seventh, eighth, ninth and tenth points of multipoint switch 47 which are in circuit, respectively, with automatic switches 43, 41, 39, 37, 35, 33, 31, 29 and 27. Time periods of point contacts for multipoint switch 47 are equal to each other and proportional to the total time required for one complete revolution of contact arm 49. While contact arm 49 is on the second point of multipoint switch 47, contact arm 53 contacts a short second point on multipoint switch 51, the position shown in the drawing, completing a circuit from potential source 25 to electrically operated switch 23 through switch 43 and the multipoint switches. Electrically operated switch 23 again closes, completing the circuit to speaker 21. The caller hears a codeform short dash, indicating that automatic switch 43 is closed and the condition to which said switch is responsive is normal. While contact arm 49 is on the third point of multipoint switch 47, contact arm 53 contacts short third and fourth points on multipoint switch 51, sequentially completing, interrupting, completing and interrupting a circuit from potential source 25 to electrically operated switch 23 through switch 41 and the multipoint switches. Electrically operated switch 23 closes twice successively and the caller hears two codeform short dashes, indicating normalcy of the condition with which automatic switch 41 is associated. In a similar manner, contact arm 53 next contacts short fifth, sixth and seventh points on multipoint switch 51 while contact arm 49 is on the fourth point of multipoint switch 47, causing three codeform short dashes to be heard at the calling station, indicating that the condition monitored by automatic switch 39 is normal.

The rotation continues, twice repeating a series of one, two and three codeform dashes to indicate normal conditions, respectively, at automatic switches 37, 35, 33, 31, 29 and 27. At the completion of one full revolution, untended local station 11 automatically hangs up, microphone 17 is disconnected, relay 13 is deenergized, contactor 15 drops out opening the circuit from potential source 61 to the terminals of motor 55 and shaft 57 comes to rest with contact arms 49 and 53 and seal-in holding cam 59 oriented at the start position.

Seal-in holding cam 59 rotates with contact arms 49 and 53 on shaft 57 and is adapted to mechanically close seal-in contactor 63 upon initiation of rotational movement, to hold said contactor closed during a full revolution and to permit said contactor to drop out at the completion of a full revolution. Thus, the seal-in arrangement serves to keep the monitoring system synchronized in the event of aberrations which may occur in the holding time of relay 13 or in the speed of motor 55, and the moving parts of the scanning assembly are caused to always reassume the proper starting position.

In the preferred embodiment, a momentary contact local test switch 65 is also provided, connected in parallel with contactor 15 of relay 13 and seal-in contactor 63, to permit local operation of the apparatus during testing and maintenance without directing an incoming call to untended local station 11. Momentary closure of local test switch 65 is sufficient to initiate operation, which will be sustained for a full revolution by the seal-in arrangement.

Those skilled in the art will recognize that certain modifications may be made to the above-described embodiment of the present invention without departing from the basic concept. For example, results similar to those described above could be obtained using, as an audible signal generator, a tape recorder having taped voice signals synchronized with a single multipoint selector switch.

It will also be obvious that, while the embodiment described herein is adapted to monitor nine conditions, a greater or lesser number of conditions can be monitored by simple modifications to the selector switch arrangement.

It will also be apparent to those skilled in the art that the embodiment above-described and shown in the drawing can be operated without the seal-in assembly and the local test switch.

While, in the foregoing description, certain specific details and operative steps have been set forth, together with certain suggested modifications, it will be obvious that considerable variations may be made in these without departing from the spirit of the present invention.

The foregoing description has been given for clearness of understanding only, and no unnecessary limitations should be understood therefrom.

What is claimed is:

1. In a telephone communication system having at least one untended local station which includes a relay having a normally open contactor adapted to close when said station is called and means for transmitting audible signals from said station into said telephone communication system, a system for monitoring for normalcy a multiplicity of preselected conditions, each of which has a different selection point and corresponding audible identification codeform signal preassigned thereto, comprising, in combination, an audible frequency signal generator juxtaposed to the means for transmitting audible signals from said station; an electrically operated switch having first and second terminals, open when deenergized, arranged to selectively complete an output circuit of said audible frequency signal generator; a multiplicity of automatic switches, each having a first terminal and a second terminal and each responsive to a condition to be monitored, adapted to close when said condition is normal and to open when said condition is otherwise than normal; a first multipoint selector switch connected to sequentially complete and interrupt circuits between the respective second terminals of said automatic switches and a common point on said first selector switch; a source of electrical potential connected between the first terminal of said electrically operated switch and a conductor common to all first terminals of said automatic switches; a second multipoint selector switch synchronized with said first multipoint selector switch, connected to sequentially complete and interrupt a circuit between said common point on said first selector switch and said second terminal of said electrically operated switch in accordance with the point position of said first multipoint selector switch and in accordance with said preassigned audible identification codeform signal and motive means to drive synchronously and continuously said first and second multipoint selector switches through successive sequential operations, connected to a source of electrical potential through the normally open contactor of the relay included in said untended local station.

2. A system according to claim 1 in combination with a circuit maintaining contactor connected in parallel with the normally open contactor of the relay included in said untended local station, adapted to close when said motive means initiates operation and to open when a single sequential operation is completed.

3. A system according to claim 2 in combination with a momentary contact local testing switch connected in parallel with said circuit maintaining contactor.

4. In a telephone communication system having at least one untended local station which includes a relay which is actuated when said station is called, and means for transmitting audible signals from said station into said telephone communication system, a system for monitoring for normalcy a multiciplicity of preselected conditions, each of which has a different selection point and corresponding audible identification codeform signal preassigned thereto, comprising, in combination, an audible frequency signal generator juxtaposed to the means for transmitting audible signals from said station; an electrically operated switch having first and second terminals arranged to selectively complete an output circuit of said audible frequency signal generator; a multiplicity of automatic switches, each having a first terminal and a second terminal and each operably responsive to a condition to be monitored; a first multipoint selector switch connected to sequentially complete and interrupt circuits between the respective second terminals of said automatic switches and a common point on said first selector switch; a source of electrical potential connected between the first terminal of said electrically operated switch and a conductor common to all first terminals of said automatic switches; a second multipoint selector switch synchronized with said first multipoint selector switch, connected to sequentially complete and interrupt a circuit between said common point on said first selector switch and said second terminal of said electrically operated switch in accordance with the point position of said first multipoint selector switch and in accordance with said preassigned audible identification codeform signal and motive means to drive synchronously and continuously said first and said second multipoint selector switches through successive sequential operations, connected to a source of electrical potential through contacts of the relay included in said untended local station.

5. A system according to claim 4 in combination with a circuit maintaining contactor connected in parallel with initiating contacts of the relay included in said untended local station, adapted to close when said motive means initiates operation and to open when a single sequential operation is completed.

6. A system according to claim 5 in combination with a momentary contact local testing switch connected in parallel with said circuit maintaining contactor.

7. In a telephone communication system having at least one untended local station which includes a relay which is actuated when said station is called, and means for transmitting audible signals from said station into said telephone communication system, a system for monitoring for normalcy a multiplicity of preselected conditions, each of which has a different selection point and corresponding audible identification codeform signal preassigned thereto, comprising, in combination, an audible frequency signal generator juxtaposed to the means for transmitting audible signals from said station; an electrically operated switch having first and second terminals, closed when deenergized, arranged to selectively interrupt an output circuit of said audible frequency signal generator; a multiplicity of automatic switches, each having a first terminal and a second terminal and each operably responsive to a condition to be monitored, adapted to open when said condition is normal and to close when said condition is otherwise than normal; a first multipoint selector switch connected to sequentially complete and interrupt circuits between the respective second terminals of said automatic switches and a common point on said first selector switch; a source of electrical potential connected between the first terminal of said electrically operated switch and a conductor common to all first terminals of said automatic switches; a second multipoint selector switch synchronized with said first multipoint selector switch, connected to sequentially complete and interrupt a circuit between said common point on said first selector switch and said second terminal of said electrically operated switch in accordance with the point position of said first multipoint selector switch and in accordance with said preassigned audible identification code-form signal and motive means to drive synchronously and continuously said first and said second multipoint selector switches through successive sequential operations, connected to a source of electrical potential through contacts of the relay included in said untended local station.

8. A system according to claim 7 in combination with a circuit maintaining contactor connected in parallel with initiating contacts of the relay included in said untended local station, adapted to close when said motive means initiates operation and to open when a single sequential operation is completed.

9. A system according to claim 8 in combination with a momentary contact local testing switch connected in parallel with said circuit maintaining contactor.

References Cited by the Examiner

UNITED STATES PATENTS

| | | | |
|---|---|---|---|
| 1,288,128 | 12/18 | Murray | 340—214 |
| 1,765,554 | 6/30 | Wensley | 179—2 |
| 1,955,043 | 4/34 | Yates et al. | 179—2 |
| 2,007,669 | 7/35 | Yates | 179—2 |
| 2,042,532 | 6/36 | Johnston | 179—2 |

DAVID G. REDINBAUGH, *Primary Examiner.*

L. MILLER ANDRUS, *Examiner.*